United States Patent Office 3,790,517
Patented Feb. 5, 1974

3,790,517
CRYSTALLINE POLYPROPYLENE COMPOSITIONS
Masaharu Koizumi, Otake, and Motoyasu Yusawa, Iwakuni, Japan, assignors to Mitsui Petrochemical Industries, Ltd., Tokyo, Japan
No Drawing. Filed Aug. 7, 1972, Ser. No. 278,191
Int. Cl. C08f 19/14, 21/04
U.S. Cl. 260—23 H             5 Claims

ABSTRACT OF THE DISCLOSURE

A crystalline polypropylene composition consisting essentially of crystalline polypropylene and a molecular weight adjusting agent selected from the group consisting of halogen- or acid amide-substituted diphenyldisulfides, halogen- or acid amide-substituted bivalent metallic dithiophenates, and derivatives of such disulfides and dithiophenates, the molecular weight adjusting agent being incorporated in an amount of 0.0001–1% by weight based on the weight of the polypropylene, the composition having been heated at above 200° C.

---

This invention relates to crystalline polypropylene compositions possessing improved workability when used for melt-shaping purposes and also to the melt-shaped articles obtained from said compositions.

Crystalline polypropylene possesses numerous excellent physical properties and as a result is being used for a wide variety of purposes. In preparing crystalline polypropylene excelling in stereospecificity, there are instances where the crystalline polypropylene prepared is that in which a major amount of the crystalline polypropylene has a molecular weight larger than that actually desirable for the melt-shaping operation, the purpose in this case being to increase the formation of crystalline polypropylene and thus check the formation of amorphous polypropylene as a by-product. The reason for this is because if one intends to obtain from the start a polymer in which a major amount of the crystalline polypropylene consists of that having a molecular weight actually suitable for melt-shaping purposes it becomes impossible to avoid the formation of the unwanted amorphous polypropylene as a by-product in a substantial quantity.

Hence, this type of crystalline polypropylene has the disadvantage that its molding cannot be satisfactorily carried out unless the poor flow of the crystalline polypropylene during its melting is prevented from becoming a fatal defect by the employment of special molding techniques.

On the other hand, when a polypropylene of good crystallinity is first prepared and the crystalline polypropylene is submitted to a molecular weight reduction treatment, there is the tendency that a crystalline polypropylene of higher molecular weight is affected to a greater extent than that of a lower molecular weight. As a result, the molecular weight distribution of a crystalline polypropylene submitted to such a treatment after its polymerization is of a narrower range. Therefore, as a result of the melt-tension during melt-shaping becoming smaller due to the narrowing of the molecular weight distribution, a much greater suitability for melt-shaping purposes is demonstrated than the case of polypropylene whose molecular weight has been adjusted during its polymerization, without substantially sacrificing the desirable physical properties that derive from the fact of its crystallinity, though the melt index is the same.

As proposals for improving the workability of crystalline polypropylene after its polymerization, such as above described, a method is known of reducing the molecular weight by heating the polypropylene in the presence or absence of oxygen (Japanese patent publication No. 6,640/60), and a method of reducing the molecular weight by heating an organic solvent solution of poly propylene in the presence of a peroxide (Japanese patent publication No. 14,490/63).

However, the former proposal, the one in which the heating is carried out at 150–180° C. in the presence of oxygen, has the drawback that difficulty is experienced in effecting the uniform contact and heating of the polypropylene and oxygen. On the other hand, the method in which the heating is carried out at 250–350° C. in the absence of oxygen has the disadvantage that a higher heating temperature and a longer heating time must be employed. Further, in the case of the latter proposal, due to the utilization of a peroxide, not only is there the disadvantage that the operation involved is complex but care must be exercised in carrying out the same, and in addition, there is the drawback that the peroxide frequently impedes the stabilizing effect of the copresent stabilizer.

With a view to overcoming the deficiencies and disadvantages of previous proposals, such as described above, without losing the above-described advantages in the improvement of the melt-shaping property of the crystalline polypropylene by the after-polymerization molecular weight adjustment, research has now been conducted, with the consequence that it has been found that the molecular weight adjustment effect that can achieve the foregoing end is demonstrated by the use in an exceedingly small amount at a temperature exceeding 200° C. of a compound selected from the group consisting of a certain class of halogen or acid amide group-substituted diphenyl disulfides or bivalent dithiophenates.

While these compounds are known as being compounding agents of rubber, it was not known at all in the past that these compounds would exhibit a molecular weight adjustment effect, such as hereinbefore noted, with respect to crystalline polypropylene.

It is therefore an object of the present invention to provide, in the case of the crystalline polypropylene compositions whose molecular weight has been adjusted after polymerization, one in which the disadvantages and deficiencies of the post-polymerization molecular weight adjustment technique of the conventional proposals have been overcome and the melt-shaping property has been improved without sacrificing the advantages of the post-polymerization molecular weight adjustment technique.

Other objects and advantages of the invention will become apparent from the following description.

The crystalline polypropylene composition of this invention is a composition incorporated with a molecular weight adjusting agent selected from the group consisting of halogen- or acid amide-substituted diphenyldisulfides or bivalent metallic dithiophenates and derivatives thereof, in an amount of 0.0001–1% by weight, based on the polypropylene, the composition being heated above 200° C.

The foregoing composition may be a crystalline polypropylene composition for melt-shaping use and may be of such forms as powder, granules, pellets, chips or flakes. The composition may also be in the form of melt-shaped articles such as filaments and filamentary structures, e.g., fiber, filament, yarn, latently crimped filament, crimp-developed filament thereof, knit cloth, woven cloth and nonwoven cloth, and films and other melt-shaped articles.

As the molecular weight adjusting agent to be used in the invention composition, mention can be made of the following compounds i.e., halogen- or acid amide-substituted diphenylsulfides or bivalent metallic dithiophenates and derivatives thereof of the following formula:

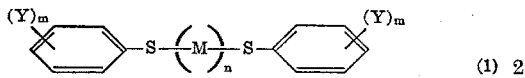

(1)

wherein M is a bivalent metallic atom, preferably Zn, Cd, Ca or Cu, $n$ is 0 or 1, Y is halogen atom, preferably Cl or Br, or an acid amide group, preferably an acid amide group of the formula —NHCOR, where R is a group selected from the class consisting of hydrogen, $C_1$–$C_4$ alkyl groups and cyclohexyl, phenyl, tolyl and benzyl groups, the Y's being the same or different, and $m$ is an integer from 1 to 5, the $m$'s being the same or different.

Specific examples of the compounds of Formula 1 include di(2-chlorophenyl)disulfide,
di(2,4-dichlorophenyl)disulfide,
di(2,4,6-trichlorophenyl)disulfide,
di(2,3,4,5,6-pentachlorophenyl)disulfide,
di(orthobenzamidophenyl)disulfide,
zinc-2-chlorothiophenate,
zinc-2,4-dichlorothiophenate,
zinc-2,4,6-trichlorothiophenate,
zinc-2,3,4,5,6-pentachlorothiophenate and
zinc-2-benzamidothiophenate.

These compounds of Formula 1 can be used either singly or in combination of two or more. Regardless of whether the compound is used singly or conjointly, the compounds of Formula 1 are used in a range of 0.0001–1% by weight (denotes weight percent of the total when conjointly used), based on the crystalline polymer. A range of 0.001% by weight (10 p.p.m.)–0.2% by weight (2000 p.p.m.) is preferred, and especially preferred is a range of 0.005% by weight (50 p.p.m.)–0.1% by weight (1000 p.p.m.), When the amount used is less than 0.0001% by weight, a satisfactory reduction in the molecular weight cannot be achieved and, on the other hand, when an amount in excess of 1% by weight is used, the moleular weight reduction activity becomes too violent and makes for difficulty in achieving the object of the invention.

The starting crystalline polypropylene to be incorporated with the hereinbefore described molecular weight adjusting agent in the composition of the present invention is one which cannot be satisfactorily melt-shaped by the conventional melt-shaping techniques, because its flow, when melted, is poor, or its molecular weight distribution is too broad. As the crystalline polypropylene suitable for use in preparing the composition, that prepared using a stereospecific polymerization catalyst is convenient, preferred being a polypropylene or polypropylene copolymer in which a clear crystal melting peak can be detected when the melting point measurement is conducted with a differential scanning calorie meter at a rate of temperature rise of 5° C. per minute starting from room temperature. One with a melt index (ASTM D 1238–65T) of less than 40 grams per 10 minutes, preferably less than 20 grams per 10 minutes, is frequently used. Useable as the propylene copolymers are the copolymers of propylene and olefins such as ethylene, butene-1 and pentene, in which the latter account for less than 30 mol percent, preferably less thas 20 mol percent, of the copolymer; and the addition polymers of polypropylene and those monomers addition-polymerizable therewith such as vinyl acetate, maleic acid, acrylic acid, methacrylic acid, styrene, alpha-methyl styrene and vinyl pyridine, in which the monomer accounts for less than 30% by weight, preferably less than 20%, of the addition polymer.

The invention is not merely one in which the molecular weight adjusting agents, such as hereinabove described, have been incorporated in a small quantity, such as specified above, but is a composition which has been heated at above 200° C., and preferably 250–350° C., in the presence of those molecular weight adjusting agents. Heating the composition at a temperature less than 200° C. is not practical, for an adjustment effect of a reduction of molecular weight cannot be achieved unless the heating is carried out for a prolonged period of time, and the object of the invention cannot be achieved.

The aforesaid heat-treatment time at above 200° C. in the presence of the molecular weight adjusting agent can be suitably determined in accordance with the extent of the molecular weight reduction desired, from such as the molecular weight of the starting crystalline polypropylene, the class of the adjusting agent and the amount of its incorporation, and the heating temperature. Usually, about 1–10 minutes is sufficient, and a time on the order of 1–7 minutes is most frequently employed.

The heat treatment in the presence of a molecular weight adjusting agent can be carried out in an atmosphere of molecular oxygen or an oxygen-containing gas. To obtain a crystalline polypropylene composition of reduced molecular weight and narrow molecular weight distribution with good reproducibility of quality, the heat treatment is preferably carried out in an atmosphere of an inert gas such as nitrogen, argon, helium and carbon dioxide.

In preparing the crystalline polypropylene composition of the present invention, any of the known techniques may be employed in mixing the crystalline polypropylene and the molecular weight adjusting agent. For instance, the two components may be intimately mixed wtih a blender, Henschel mixer and the like. Further, for example, master-batch pellets consisting of a molecular weight adjusting agent and a portion of the crystalline polypropylene can be prepared first, and the so prepared pellets can then be blended with the remaining portion of the crystalline polypropylene.

When a composition intended for melt-shaping use is to be prepared by this invention, a composition, such as above-described, is heated at above 200° C. by suitable means and then made into such forms as powder, granules, pellets, chips or flakes. The most commonly practiced method is to carry out the heating at above 200° C., using a pelletizer. If desired, the composition can be heat-melted first in another suitable vessel and thereafter made into the desired form or can be cooled and thereafter comminuted.

When it is intended to obtain the crystalline polypropylene composition of the present invention in the form of melt-shaped articles, the heating of the composition at above 200° C. may be carried out during the molding operation. For instance, the mixture of crystalline polypropylene and a molecular weight adjusting agent can be first molded at below 200° C., to obtain a composition in a form suitable for melt-shaping use, after which it can be submitted to heating conditions of above 200° C. during, for instance, the step of meet-spinning the composition into filaments or casting it into films. Needless to say, a composition for melt-shaping use which has been heated in advance at 200° C. can be used, and this can be molded at an optional temperature to obtain the composition having the form of a melt-shaped article. However, the most noteworthy improvement is achieved in the case where the composition is that in the form intended for melt-shaping use and has been submitted to a heat treatment at above 200° C. in the presence of the foregoing molecular weight adjusting agents, and the case of melt-shaped articles melt-shaped from this composition.

Therefore, in this invention the heat treatment at above 200° C. can be carried out in one of the following ways depending upon the final form of the composition: (i) application of the heat at the time of preparation of the composition for melt-shaping use; (ii) application of the heat subsequent to the preparation of the composition for melt-shaping use and during the time of the preparation of the melt-shaped article; and also (iii) application of the heat at the time of both the preparation of the composition for melt-shaping use and the preparation of the melt-shaped article. However, especially desirable results are had in the case of (i) and (iii).

The invention crystalline polypropylene composition can be incorporated with other additives such as, for example, stabilizers, ultraviolet absorbents, colorants, fillers, lubricants, nucleating agents, antistatic agents, dye-sites and flame retardants. These additive scan be added during the time the molecular weight adjusting agent and the crystalline polypropylene are mixed or may be incorporated in advance in the starting crystalline polypropylene or be added at the time of the preparation of the composition for melt-shaping use that has been heated at above 200° C.

Especially, in the case of the stabilizers, desirable results are frequently had. As such stabilizers, mention can be made of such as, for example, as the phenolic stabilizers such as 2,6-tert.-butyl-4-methylphenol,
tetrakis[methylene(3,5-di-tert.-butyl-4-hydroxyhydrocinnamate)]methane,
n-octadecyl-3-(4'-hydroxy-3',5'-di-tert.-butylphenyl) propionate,
2,2'-methylenebis(4-methyl-6-tert.-butylphenol),
4,4'-butylidenebis(3-methyl-6-tert.-butylphenol),
4,4'-thiobis(3-methyl-6-tert.-butylphenol),
2,2'-thiobis(4-methyl-6-tert.-butylphenol),
1,3,5-trimethyl-2,4,6-tris(3,5-di-tert.-butyl-4-hydroxybenzyl)benzene and
1,3,5-tris(2-methyl-4-hydroxy-5-tert.-butylphenol) butane, the organic sulfur-containing stabilizers such as dilaurylthiodipropionate and distearylthiodipropionate, the organic phosphorus-containing stabilizers such as tridecyl phosphite and trinonylphenyl phosphite, and the metallic soap type stabilizers such as calcium stearate, zinc stearate, sodium stearate, calcium oleate and zinc palmitate. These stabilizers may be used either singly or in combinations of two or more. They are usually used in an amount of 0.01–1% by weight of the starting crystalline polypropylene.

On the other hand, as specific examples of the other additives, the ultraviolet absorbents include such as for example, 2-hydroxy-4-octoxybenzophenone,
2(2'-hydroxy-3',5'-di-tert.-butylphenyl)-6-chloro-1,2,3-benzotriazole,
2(2'-hydroxyphenyl)-6-chloro-1,2,3-benzotriazole,
[2,2'-thiobis(4-tert.-octylphenolate)]butylaminenickel and the Ni salt of 3,5-di-tert.-butyl-4-hydroxybenzylphosphonic acid monoethylate; the colorants include such as, for example, titanium white, cadmium yellow, cyanine blue, quinacridone red, ultramarine and carbon black; the fillers include such as, for example, glass fibers, asbestos, finely divided silica, talc, clay, calcium sulfate and calcium carbonate; the lubricants include such as, for example, calcium stearate, ethylenebisstearoamide, zinc stearate, erucic acid amide and oleic acid amide; the nucleating agents include such as, for example, sodium benzoate, zinc phthalate and aluminum tri-tert.-butylbenzoate; the antistatic agents include such, for example, as N,N-bis(2-hydroxyethyl)alkylamine, N,N-bis(2-hydroxyethylmonostearate)alkylamine and monostearyl glyceride; the dye-sites include such as, for example, the vinyl pyridine copolymers and organonickel compounds; and the flame retardants include such as, for example, the bromine-containing organic compounds, antimony trioxide, and phosphoric and phosphorous compounds.

As one example of the crystalline polypropylene composition in the form of a melt-shaped composition, a polypropylene crimped yarn can be mentioned. This kind of crimped yarn can be manufactured by operating as hereinafter described in melt-spinning the melt-shaping composition that has or has not received the heat treatment at above 200° C. A polypropylene composition melt-extruded from a single extruder has its stream divided into two separately flowing streams and, while maintaining a state such as to cause a difference to occur in the temperature and/or dwell time between the two streams and heating at least the higher temperature side to above 200° C., the two streams are spun from spinning nozzles to form a composite yarn. Alternately, a single stream of the polypropylene composition extruded from a single extruder is maintained in such a state that a difference occurs in the temperature and/or dwell time cross-sectionally of the stream and in the meantime at least the higher temperature side is heated to above 200° C., followed by spinning the yarn. The yarns obtained by operating as described above are then drawn and thereafter submitted to a relaxation treatment under heated conditions. The drawing is preferably carried out at a temperature not exceeding 140° C. and to a length 3–7 times the undrawn length. On the other hand, the relaxation treatment under heated conditions is preferably carried out at a temperature of 100–180° C. As a result of this heat-relaxation treatment, the crimps of the drawn latently crimped yarn are developed. The freshly spun yarn can be held for from one hour to one week at a practically constant temperature below 100° C., and preferably from 50° C. to room temperature, and thereafter submitted to the drawing treatment.

As another example of the crystalline polypropylene composition in the form of a melt-shaped composition, there can be mentioned the filaments for making nonwoven fabrics. Filaments of this kind can be obtained by using a melt-shaping composition, which has received the heat treatment at above 200° C., and melt-spinning same at an optional melt-spinnable temperature of above or below 200° C. followed by the use of a high speed jet stream apparatus and taking up the filaments at a high speed of 2000–5000 meters per minute without the possibility of the breakage of the filaments during the drafting. Alternately, a melt-shaping composition, which has not received the heat treatment at above 200° C. can be melt-spun at a temperature above 200° C. followed by taking up the resulting filaments in like manner with the high speed jet stream apparatus. The drafted filaments can be collected directly on a collecting screen or belt at random and be formed into a nonwoven fabric. Thus, since the filaments can be taken up at high speed and a high draft ratio while avoiding the breakage of the filaments, the filaments have a high tenacity and low elongation. As a consequence, the nonwoven web made from these filaments naturally has great strength.

As another example of the crystalline polypropylene composition in the form of a melt-shaped composition, laminate layers for extrusion lamination can be mentioned.

A laminate layer of this kind can be obtained by a process of extrusion lamination consisting of melt-extruding onto a substrate, such as a biaxially oriented polypropylene film or cellophane, at an optional melt-shapable temperature of above or below 200° C. the melt-shaping composition, which has received the heat treatment at above 200° C., or melt-extruding at a temperature of above 200° C. in like manner the melt-shaping composition, which has not received the heat treatment at above 200° C.

Since the primary purpose of this lamination process is to impart heat-sealability, the laminate layer must be thin and without any spots of nonuniform thickness. Further, it is required that the lamination speed is a high speed of ca. 100 meters per minute.

The use of the invention melt-shaping composition in which the melt-shaping property has been improved adequately meets these requirements and provides results which are exceedingly satisfactory.

As still another example of the crystalline polypropylene composition in the form of a melt-shaped composition, there can be mentioned the low temperature-spun filaments. Filaments of this kind can be obtained by melt-spinning at an optional melt-spinnable temperature of below or above 200° C. the melt-shaping composition, which has received the heat treatment at above 200° C., or by melt-spinning at a temperature of above 200° C. the melt-shaping composition, which has not received the heat treatment at above 200° C. While the melt-spinning of crystalline polypropylene is usually carried out at above 280° C., the melt-spinning of the melt-shaping composition of the present invention can be carried out at a temperature substantially lower than this temperature. The cooling conditions of the molten filaments are milder, and further the requirement as to the heat resistance of the pigment is milder.

As an additional example of the crystalline composition in the form of a melt-shaped composition, there can be mentioned the shaped articles that are obtained by injection molding. Shaped articles of this kind are obtained by molding at an optional temperature of below or above 200° C. at which melt-shaping is possible, the melt-shaping composition, which has received the heat treatment at above 200° C., or by molding at a temperature above 200° C. the melt-shaping composition, which has not received the heat treatment at above 200° C.

In general, those compositions having good melt-shaping properties are required in most cases for carrying out the injection molding. This requirement is met and extremely satisfactory results are provided by the use of the melt-shaping composition of the present invention.

Several embodiments of the composition of this invention will now be illustrated in more details by reference to Examples and Comparative Examples.

In Examples and Comparative Examples, various properties were determined and evaluated in the following manners.

(1) Melt index

The melt index was determined according to ASTM D 1238–65 T.

(2) Melt-shaping suitability 6 g. of a composition for melt spinning were charged into a cylinder of a melt tension tester maintained at a prescribed spinning temperature and preliminarily heated for 5 minutes in a nitrogen atmosphere. Then, the composition was extruded from a nozzle having a diameter of 0.5 mm. and a land length of 3 mm. at a rate of 20 cm./min., and the extrudate was taken off and wound at a rate of 300 m./min. by a constant rate winder. The spinning condition during the above operation was observed and the melt-shaping suitability was evaluated on the following rating.

MELT-SHAPING SUITABILITY

| Grade | Spinning condition |
|---|---|
| 1 | The spinning condition was very good and no yarn breakage occurred even when the winding rate was elevated to 500 m./min. |
| 2 | The spinning condition was good and no yarn breakage occurred. |
| 3 | The spinning condition was not so good but no yarn breakage occurred; however, spinning unevenness was observed. |
| 4 | The spinning condition was bad, and occurrence of yarn breakages or spinning unevenness was observed. |
| 5 | Continuous spinning was impossible. |

The melt tension tester referred to herein was a testing apparatus constructed by providing a melt indexer prescribed in ASTM 1238–57 T with a constant rate extruder, a device for winding filaments at a constant speed and a device for detecting the melt tension during spinning.

The spinning temperature was determined based on the following standard:

| Melt index of starting crystalline polypropylene (g./10 minutes) | Melt index of sample pellets (g./10 minutes) | Spinning temperature (° C.) |
|---|---|---|
| Less than 3 | Less than 3 | 270 |
| Do | Not less than 3 but less than 10. | 260 |
| Do | Not less than 10 but less than 30 | 240 |
| Do | 30 or more | 220 |
| Not less than 3 but less than 10. | Not less than 3 but less than 10. | 250 |
| Do | Not less than 10 but less than 30. | 230 |
| Do | 30 or more | 210 |
| Not less than 10 but less than 30. | Not less than 10 but less than 30. | 220 |
| Do | 30 or more | 200 |
| 30 or more | do | 190 |

Examples 1–25 and Comparative Examples 1–16

A crystalline polypropylene indicated in Table 1 was homogeneously mixed by means of a Henschel mixer with 0.1% by weight of tetrakis-[methylene-(3,5-di-tert.-butyl - 4 - hydroxyhydrocinnamate)]-methane, 0.1% by weight of 2,6-di-tert.-butyl-4-methylphenol, 0.1% by weight of calcium stearate and a molecular weight adjusting agent indicated in Table 1, and the blend was molded into pellets at a temperature indicated in Table 1 for a residence time indicated in Table 1. These pellets were used as melt-shaping compositions. Properties of these pellets are shown in Table 1. For comparison, compositions failing to meet the requirements of this invention are also shown (Comparative Examples).

TABLE 1(1).—CRYSTALLINE POLYPROPYLENE COMPOSITIONS FOR MELT-SHAPING

| | Crystalline polypropylene (PP), melt index (g./10 min.) | Molecular weight adjusting agent | | Pelletizing conditions | | Melt index of pellets (g./10 min.) | Melt-shaping suitability (grade) |
|---|---|---|---|---|---|---|---|
| | | Kind | Ratio to PP (percent by weight) | Temp. (°C.) | Residence time (sec.) | | |
| Example 1 | 1.5 | Di(orthobenzamidophenyl)disulfide | 0.05 | 180 | 90 | 1.8 | 2 |
| Comparative Example 1 | 1.5 | | | 180 | 90 | 1.6 | 5 |
| Example 2 | 1.5 | Di(orthobenzamidophenyl)disulfide | 0.03 | 210 | 90 | 2.6 | 2 |
| Comparative Example 2 | 1.5 | | | 210 | 90 | 1.6 | 5 |
| Example 3 | 1.5 | Di(orthobenzamidophenyl)disulfide | 0.03 | 230 | 90 | 8.6 | 2 |
| Comparative Example 3 | 1.5 | | | 230 | 90 | 2.1 | 5 |
| Example 4 | 1.5 | Di(orthobenzamidophenyl)disulfide | 0.05 | 250 | 90 | 29 | 1 |
| Example 5 | 1.5 | ...do... | 0.03 | 250 | 90 | 23 | 1 |
| Example 6 | 1.5 | ...do... | 0.01 | 250 | 90 | 9.6 | 1 |
| Comparative Example 4 | 1.5 | | | 250 | 90 | 3.1 | 5 |
| Example 7 | 1.5 | Di(orthobenzamidophenyl)disulfide | 0.01 | 280 | 90 | 17 | 1 |
| Comparative Example 5 | 1.5 | | | 280 | 90 | 4.5 | 4 |
| Example 8 | 1.5 | Di(orthobenzamidophenyl)disulfide | 0.01 | 280 | 50 | 13 | 2 |

TABLE 1(2)

| | Crystalline polypropylene (PP), melt index (g./10 min.) | Molecular weight adjusting agent | | Pelletizing conditions | | Melt index of pellets (g./10 min.) | Melt-shaping suitability (grade) |
|---|---|---|---|---|---|---|---|
| | | Kind | Ratio to PP (percent by weight) | Temp. (°C.) | Residence time (sec.) | | |
| Comparative Example 6 | 1.5 | | | 280 | 50 | 3.5 | 5 |
| Example 9 | 1.5 | Di(orthobenzamidophenyl)disulfide | 0.01 | 280 | 30 | 7.2 | 2 |
| Comparative Example 7 | 1.5 | | | 280 | 30 | 2.2 | 5 |
| Example 10 | 5.2 | Di(orthobenzamidophenyl)disulfide | 0.20 | 180 | 90 | 13 | 2 |
| Example 11 | 5.2 | ...do... | 0.05 | 180 | 90 | 5.8 | 2 |
| Comparative Example 8 | 5.2 | | | 180 | 90 | 5.4 | 5 |
| Example 12 | 5.2 | Di(orthobenzamidophenyl)disulfide | 0.005 | 230 | 90 | 13 | 2 |
| Comparative Example 9 | 5.2 | | | 230 | 90 | 5.6 | 5 |
| Example 13 | 5.2 | Di(orthobenzamidophenyl)disulfide | 0.01 | 240 | 90 | 28 | 1 |
| Comparative Example 10 | 5.2 | | | 240 | 90 | 5.8 | 5 |
| Example 14 | 11 | Di(orthobenzamidophenyl)disulfide | 0.01 | 230 | 90 | 27 | 1 |
| Comparative Example 11 | 11 | | | 230 | 90 | 17 | 5 |
| Example 15 | 1.5 | Zinc-2,4-dichlorothiophenate | 0.10 | 180 | 90 | 1.8 | 2 |
| Example 16 | 5.2 | ...do... | 0.01 | 230 | 90 | 16 | 2 |
| Example 17 | 1.5 | Zinc-2-benzamidothiophenate | 0.03 | 260 | 100 | 12 | 2 |
| Example 18 | 1.5 | ...do... | 0.01 | 260 | 100 | 8.3 | 2 |
| Comparative Example 12 | 1.5 | | | 260 | 100 | 2.6 | 5 |

TABLE 1(3)

| | Crystalline polypropylene (PP), melt index (g./10 min.) | Molecular weight adjusting agent | | Pelletizing conditions | | Melt index of pellets (g./10 min.) | Melt-shaping suitability (grade) |
|---|---|---|---|---|---|---|---|
| | | Kind | Ratio to PP (percent by weight) | Temp. (°C.) | Residence time (sec.) | | |
| Example 19 | 1.5 | Zinc-2,3,4,5,6-pentachlorothiophenate | 0.01 | 260 | 100 | 5.9 | 2 |
| Example 20 | 1.5 | Di(2,3,4,5,6-pentachlorophenyl)disulfide | 0.01 | 260 | 100 | 7.5 | 2 |
| Example 21 | 1.5 | {Di(orthobenzamidophenyl)disulfide / Zinc-2-benzamidothiophenate} | 0.005 / 0.005 | 260 | 100 | 8.9 | 1 |
| Comparative Example 13 | 1.5 | Di(orthobenzamidophenyl)disulfide | 2.5 | 220 | 50 | (1) | (1) |
| Example 22 | 1.5 | ...do... | 0.5 | 220 | 50 | 19 | 1 |
| Example 23 | 1.5 | ...do... | 0.0005 | 280 | 90 | 9.3 | 2 |
| Comparative Example 14 | 1.5 | ...do... | 0.00005 | 280 | 90 | 4.9 | 4 |
| Comparative Example 15 | 1.5 | Di(2,3,4,5,6-pentachlorophenyl)disulfide | 2.5 | 220 | 50 | (1) | (1) |
| Example 24 | 1.5 | ...do... | 0.5 | 220 | 50 | 15 | 1 |
| Example 25 | 1.5 | ...do... | 0.0005 | 280 | 90 | 7.7 | 2 |
| Comparative Example 16 | 1.5 | ...do... | 0.00005 | 280 | 90 | 4.8 | 4 |

1 Pellets had no commercial value because of extreme coloration and smelling.

Examples 26–35 and Comparative Examples 17–24

Compositions were prepared by employing additives indicated in Table 2 under conditions also indicated in Table 2. The preparation of these compositions was conducted in the same manner as in Example 1. For comparison compositions failing to meet the requirements of this invention are also shown in Table 2 (Comparative Examples).

TABLE 2(1)

| | Crystalline polypropylene (PP), melt index (g./10 min.) | Additives other than molecular weight adjusting agent | | Molecular weight adjusting agent | | Pelletizing conditions | | Melt index of pellets (g./10 min.) | Melt-shaping suitability (grade) |
|---|---|---|---|---|---|---|---|---|---|
| | | Kind | Ratio to PP (percent by weight) | Kind | Ratio to PP (percent by weight) | Temp. (°C.) | Residence time (sec.) | | |
| Example 26 | 1.5 | Stearyl(2,5-di-tert.-butyl-4-hydroxy)hydrocinnamate, Dilauryldithiopropionate, Calcium stearate | 0.1 0.2 0.1 | Di(orthobenzamidophenyl)disulfide | 0.03 | 230 | 90 | 9.6 | 1 |
| Comparative Example 17 | 1.5 | Same as above | | | | 230 | 90 | 2.2 | 5 |
| Example 27 | 1.5 | 2,5-di-tert.-butyl-p-cresol, Distearyldithiopropionate, Calcium stearate | 0.1 0.2 0.1 | Di(2,3,4,5,6-pentachlorophenyl)disulfide | 0.01 | 260 | 90 | 6.2 | 2 |
| Example 28 | 1.5 | Tetrakis[methylene(3,5-di-tert.-butyl-4-hydroxyhydrocinnamate)]methane, 2,5-di-tert.-butyl-p-cresol, Calcium stearate | 0.1 0.1 0.1 | Di(orthobenzamidophenyl)disulfide | 0.03 | 230 | 90 | 8.6 | 2 |
| Example 29 | 1.5 | Tetrakis[methylene(3,5-di-tert.-butyl-4-hydroxyhydrocinnamate)]methane, 2,5-di-tert.-butyl-p-cresol, Calcium stearate, 2-hydroxy-4-octoxybenzophenone, Cadmium yellow | 0.1 0.1 0.5 0.1 0.2 | do | 0.01 | 250 | 90 | 13 | 1 |
| Comparative Example 18 | 1.5 | Same as above | | | | 250 | 90 | 3.6 | 5 |

TABLE 2(2)

| | Crystalline polypropylene (PP), melt index (g./10 min.) | Additives other than molecular weight adjusting agent | | Molecular weight adjusting agent | | Pelletizing conditions | | Melt index of pellets (g./10 min.) | Melt-shaping suitability (grade) |
|---|---|---|---|---|---|---|---|---|---|
| | | Kind | Ratio to PP (percent by weight) | Kind | Ratio to PP (percent by weight) | Temp. (°C.) | Residence time (sec.) | | |
| Example 30 | 1.5 | Tetrakis[methylene(3,5-di-tert.-butyl-4-hydroxyhydrocinnamate)]methane, 2,5-di-tert.-butyl-p-cresol, N,N-bis(2-hydroxyethyl)alkylamine | 0.1 0.1 0.5 | Zinc-2,4-dichlorothiophenate | 0.03 | 260 | 100 | 15 | 1 |
| Comparative Example 19 | 1.5 | Same as above | | | | 260 | 100 | 3.9 | 5 |
| Example 31 | 1.5 | Tetrakis[methylene(3,5-di-tert.-butyl-4-hydroxyhydrocinnamate)]methane, 2,5-di-tert.-butyl-p-cresol, Aluminum tri-tert.-butylbenzoate | 0.1 0.1 0.1 | Di(orthobenzamidophenyl)disulfide | 0.03 | 230 | 100 | 8.9 | 2 |
| Comparative Example 20 | 1.5 | Same as above | | | | 230 | 100 | 2.6 | 5 |

TABLE 2(3)

| | Crystalline polypropylene (PP), melt index (g./10 min.) | Additives other than molecular weight adjusting agent | | Molecular weight adjusting agent | | Pelletizing conditions | | Melt index of pellets (g./10 min.) | Melt-shaping suitability (grade) |
|---|---|---|---|---|---|---|---|---|---|
| | | Kind | Ratio to PP (percent by weight) | Kind | Ratio to PP (percent by weight) | Temp. (°C.) | Residence time (sec.) | | |
| Example 32 | 1.5 | Tetrakis[methylene(3,5-di-tert.-butyl-4-hydroxyhydrocinnamate)]methane, 2,5-di-tert.-butyl-p-cresol, Finely divided silica | 0.1 0.1 0.5 | Di(orthobenzamidophenyl)disulfide | 0.03 | 230 | 100 | 8.2 | 2 |
| Comparative Example 21 | 1.5 | Same as above | | | | 230 | 100 | 2.3 | 5 |

TABLE 2(4)

| | Crystalline polypropylene (PP), melt index (g./10 min.) | Additives other than molecular weight adjusting agent | | Molecular weight adjusting agent | | Pelletizing conditions | | Melt index of pellets (g./10 min.) | Melt-shaping suitability (grade) |
|---|---|---|---|---|---|---|---|---|---|
| | | Kind | Ratio to PP (percent by weight) | Kind | Ratio to PP (percent by weight) | Temp. (°C.) | Residence time (sec.) | | |
| Example 33 | 1.5 | Tetrakis[methylene(3,5-di-tert.-butyl-4-hydroxy-hydrocinnamate)]methane.<br>2,5-di-tert.-butyl-p-cresol<br>Calcium stearate<br>Erucic acid amide | 0.1<br>0.1<br>0.1<br>0.2 | Di(orthobenzamidophenyl)disulfide | 0.30 | 230 | 100 | 9.2 | 1 |
| Comparative Example 22 | 1.5 | Same as above | | | | 230 | 100 | 2.8 | 5 |
| Example 34 | 1.5 | Tetrakis[methylene(3,5-di-tert.-butyl-4-hydroxy-hydrocinnamate)]methane.<br>2,5-di-tert.-butyl-p-cresol<br>Calcium stearate<br>4-vinylpyridine polymer | 0.1<br>0.1<br>0.1<br>3.0 | Di(orthobenzamidophenyl)disulfide | 0.03 | 230 | 100 | 14 | 2 |
| Comparative Example 23 | 1.5 | Same as above | | | | 230 | 100 | 5.2 | 5 |

TABLE 2(5)

| | Crystalline polypropylene (PP), melt index (g./10 min.) | Additives other than molecular weight adjusting agent | | Molecular weight adjusting agent | | Pelletizing conditions | | Melt index of pellets (g./10 min.) | Melt-shaping suitability (grade) |
|---|---|---|---|---|---|---|---|---|---|
| | | Kind | Ratio to PP (percent by weight) | Kind | Ratio to PP (percent by weight) | Temp. (°C.) | Residence time (sec.) | | |
| Example 35 | 1.5 | Tetrakis[methylene(3,5-di-tert.-butyl-4-hydroxy-hydrocinnamate)]methane.<br>2,5-di-tert.-butyl-p-cresol<br>Calcium stearate<br>Hexabromocyclododecane<br>Antimony trioxide | 0.1<br>0.1<br>0.1<br>2.0<br>1.0 | Di(orthobenzamidophenyl)disulfide | 0.03 | 210 | 100 | 5.9 | 2 |
| Comparative Example 24 | 1.5 | Same as above | | | | 210 | 100 | 3.2 | 5 |

Examples 36 and 37 and Comparative Examples 25 and 26

Results obtained when this invention was applied to polyethylene (Comparative Examples) are shown in Table 3 given below. For comparison, compositions according to this invention (Examples) are also shown in Table 3.

TABLE 3

| | Starting resin | Melt index (g./10 min.) | Additives other than molecular weight adjusting agent | Molecular weight adjusting agent | | Pelletizing conditions | | Melt index of pellets (g./10 min.) | Melt-shaping suitability (grade) |
|---|---|---|---|---|---|---|---|---|---|
| | | | | Kind | Ratio to PP (percent by weight) | Temp. (°C.) | Residence time (sec.) | | |
| Example 36 | Crystalline polypropylene | 0.91 | Same as in Example 28 | Di(orthobenzamidopheynl)disulfide | 0.05 | 230 | 90 | 7.5 | 1 |
| Comparative Example 25 | High density polyethylene | 0.93 | do | do | 0.05 | 230 | 90 | 0.86 | 5 |
| Example 37 | Crystalline polypropylene | 0.91 | do | Di(2,3,4,5,6-pentachlorophenyl)disulfide | 0.10 | 260 | 90 | 13 | 1 |
| Comparative Example 26 | High density polyethylene | 0.93 | do | do | 0.10 | 260 | 90 | 0.83 | 5 |

NOTE:
1 "Hi-zex 5000 S" manufactured by Mitsui Petrochemical Industries was a high density polyethylene.
2 The evaluation of the melt-shaping suitability of high density polyethylene was made in the same manner as in crystalline polypropylene.

What we claim:

1. A crystalline polypropylene composition consisting essentially of crystalline polypropylene and a molecular weight adjusting agent selected from the group consisting of halogen- or acid amide-substituted diphenyldisulfides or bivalent metallic dithiophenates of the formula

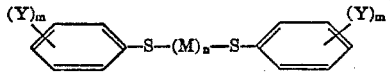

wherein M is a bivalent metallic atom selected from the group consisting of Zn, Cd, Ca and Cu, $n$ is selected from the group consisting of 0 and 1, Y is selected from the group consisting of Cl and an aromatic acid amide group of the formula

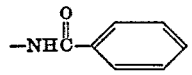

the Y's being the same or different, and $m$ is an integer from 1 to 5, the two $m$'s being the same or different, said molecular weight adjusting agent being incorporated in an amount of 0.0001–1% by weight based on the weight of said polypropylene, said composition having been heated at above 200° C.

2. The composition of claim 1 wherein said crystalline polypropylene composition is a composition suitably used for melt-shaping purposes.

3. The composition of claim 1 wherein said crystalline polypropylene composition is a melt-shaped article.

4. The composition of claim 1, wherein said composition contains, in addition to said molecular weight adjusting agent, a stabilizer selected from the group consisting of 2,6-di-tert.-butyl-4-methylphenol, tetrakis [methylene-(3,5-di-tert.-butyl-4-hydroxy hydrocinnamate)]methane, n-octadecyl - 3 - (4' - hydroxy-3',5'-di-tert.-butylphenyl) propionate, 2,2'-methylenebis(4-methyl-6-tert.-butylphenol), 4,4'-butylidenebis(3-methyl - 6 - tert.-butylphenol), 4,4'-thiobis(3-methyl-6-tert.-butylphenol), 2,2'-thiobis(4-methyl-6-tert.-butylphenol), 1,3,5-trimethyl-2,4,6-tris(3,5-di-tert.-butyl-4-hydroxybenzyl)benzene, 1,3,5-tris(2-methyl-4-hydroxy-5-tert.-butylphenol)butane, dilauryl-thiodipropionate, distearylthiodipropionate, tridecylphosphite,-tridecylphosphite, trinonylphenyl phosphite, calcium stearate; zinc stearate, sodium stearate, calcium oleate and zinc palmitate, said stabilizer being incorporated in an amount of 0.01–1% by weight based on the weight of said crystalline polypropylene.

5. The composition of claim 1, wherein said crystalline polypropylene composition is heated to a temperature above 200° C. in an atmosphere of an inert gas.

References Cited
UNITED STATES PATENTS

| | | | |
|---|---|---|---|
| 2,967,850 | 1/1961 | Hawkins | 260—45.75 |
| 3,387,040 | 6/1968 | Jolles | 260—45.75 |
| 2,978,430 | 4/1961 | Thompson | 260—31.8 |

DONALD E. CZAJA, Primary Examiner

W. E. PARKER, Assistant Examiner

U.S. Cl. X.R.

260—45.7 S, 45.75 C, 45.95 C

UNITED STATES PATENT OFFICE
CERTIFICATE OF CORRECTION

Patent No. 3,790,517    Dated February 5, 1974

Inventor(s) Masaharu KOIZUMI and Motoyasu YUSAWA

It is certified that error appears in the above-identified patent and that said Letters Patent are hereby corrected as shown below:

IN THE HEADING:

Insert patentees' claim for priority as follows:

-- Claims priority, application Japan, No. 46/60600, August 12, 1971; application Japan, No. 47/61305, June 21, 1972 --

Signed and sealed this 9th day of April 1974.

(SEAL)
Attest:

EDWARD M. FLETCHER, JR.
Attesting Officer

C. MARSHALL DANN
Commissioner of Patents